(12) United States Patent
Pujari et al.

(10) Patent No.: US 12,401,583 B2
(45) Date of Patent: Aug. 26, 2025

(54) METHOD AND SYSTEM FOR MONITORING WIRELESS LINK QUALITY OF HANDHELD ULTRASOUND DEVICES

(71) Applicant: GE Precision Healthcare LLC, Wauwatosa, WI (US)

(72) Inventors: Sambit Pujari, Vestfold (NO); Sigurd Storve, Østerås (NO)

(73) Assignee: GE Precision Healthcare LLC, Waukesha, WI (US)

( * ) Notice: Subject to any disclaimer, the term of this patent is extended or adjusted under 35 U.S.C. 154(b) by 845 days.

(21) Appl. No.: 17/512,077

(22) Filed: Oct. 27, 2021

(65) Prior Publication Data
US 2023/0125813 A1    Apr. 27, 2023

(51) Int. Cl.
| | |
|---|---|
| H04L 43/16 | (2022.01) |
| H04L 69/16 | (2022.01) |
| H04W 24/08 | (2009.01) |
| H04W 76/10 | (2018.01) |
| H04W 84/12 | (2009.01) |

(52) U.S. Cl.
CPC ............. *H04L 43/16* (2013.01); *H04L 69/16* (2013.01); *H04W 24/08* (2013.01); *H04W 76/10* (2018.02); *H04W 84/12* (2013.01)

(58) Field of Classification Search
CPC ........ H04L 43/16; H04L 69/16; H04W 76/10; H04W 24/08; H04W 84/12; H04W 76/19
See application file for complete search history.

(56) References Cited

U.S. PATENT DOCUMENTS

| | | | |
|---|---|---|---|
| 7,436,810 B2 | 10/2008 | Ma et al. | |
| 7,660,565 B2 | 2/2010 | Patel et al. | |
| 7,801,620 B2 | 9/2010 | Freeberg | |
| 7,808,908 B1 | 10/2010 | Bharghavan et al. | |
| 8,005,434 B2 | 8/2011 | Paas et al. | |
| 8,140,161 B2 | 3/2012 | Willerton et al. | |

(Continued)

FOREIGN PATENT DOCUMENTS

| | | |
|---|---|---|
| EP | 1389402 | 2/2004 |
| EP | 2359628 | 8/2011 |

(Continued)

*Primary Examiner* — Lan N Moore
*Assistant Examiner* — Latresa A McCallum
(74) *Attorney, Agent, or Firm* — McAndrews, Held & Malloy, Ltd.; Daniel Bissing; David Bates (57) ABSTRACT

A system and method for providing feedback to a user of a wireless ultrasound probe regarding a wireless link quality between the ultrasound probe and a display device is provided. The method includes receiving, by a display processor of a display device, an acquisition frame rate from a wireless ultrasound probe. The method includes determining, by the display processor, an analysis interval length based on the acquisition frame rate and a wireless connection state loss threshold. The method includes receiving and counting ultrasound image frames wirelessly transmitted to the display device from the wireless ultrasound probe during the analysis interval length. The method includes determining that a number of lost ultrasound frames during the analysis interval length exceeds the wireless connection state loss threshold. The method includes causing a display system of the display device to present a bad connection state identifier.

20 Claims, 4 Drawing Sheets

(56) References Cited

U.S. PATENT DOCUMENTS

| | | | |
|---|---|---|---|
| 8,380,126 | B1 | 2/2013 | Ma et al. |
| 8,489,427 | B2 | 7/2013 | Simpson et al. |
| 8,583,777 | B1 | 11/2013 | Boyle et al. |
| 9,629,004 | B2 | 4/2017 | Hassan et al. |
| 9,686,690 | B2 | 6/2017 | Montemurro et al. |
| 9,877,332 | B1 | 1/2018 | Bonn et al. |
| 10,244,558 | B2 | 3/2019 | Baba et al. |
| 10,383,002 | B2 | 8/2019 | Striegel et al. |
| 2008/0198787 | A1 | 8/2008 | Nguyen |
| 2011/0167291 | A1* | 7/2011 | Liu ................... H04W 52/20 713/340 |
| 2012/0136252 | A1 | 5/2012 | Cho |
| 2012/0141002 | A1* | 6/2012 | Urbano ................ G01S 7/5205 382/131 |
| 2012/0179037 | A1* | 7/2012 | Halmann ............... A61B 8/585 600/443 |
| 2014/0081142 | A1* | 3/2014 | Toma ................... A61B 8/4263 600/443 |
| 2014/0164596 | A1 | 6/2014 | Hoctor et al. |
| 2017/0143306 | A1 | 5/2017 | Rothberg et al. |
| 2017/0360412 | A1 | 12/2017 | Rothberg et al. |
| 2019/0365352 | A1* | 12/2019 | Song ..................... A61B 8/56 |
| 2020/0107238 | A1 | 4/2020 | Silberstein et al. |
| 2021/0015461 | A1* | 1/2021 | Karasawa ............. G01S 7/5208 |
| 2021/0097689 | A1 | 4/2021 | Zaslavsky et al. |
| 2021/0136618 | A1* | 5/2021 | Liu ..................... H04W 72/044 |
| 2022/0125414 | A1* | 4/2022 | Noguchi ............... G01S 7/5205 |

FOREIGN PATENT DOCUMENTS

| | | | | |
|---|---|---|---|---|
| WO | 2005029767 | | 3/2005 | |
| WO | WO-2009047698 | A1 * | 4/2009 | ............... A61B 8/00 |
| WO | 2010069585 | | 6/2010 | |

\* cited by examiner

METHOD AND SYSTEM FOR MONITORING WIRELESS LINK QUALITY OF HANDHELD ULTRASOUND DEVICES

FIELD

Certain embodiments relate to ultrasound imaging. More specifically, certain embodiments relate to a method and system for providing feedback to a user of a wireless ultrasound probe regarding a wireless link quality between the ultrasound probe and a display device.

BACKGROUND

Ultrasound imaging is a medical imaging technique for imaging organs and soft tissues in a human body. Ultrasound imaging uses real time, non-invasive high frequency sound waves to produce a series of two-dimensional (2D) and/or three-dimensional (3D) images.

Wireless ultrasound probes send ultrasound data wirelessly to a display device. The ultrasound data may be transmitted using an unreliable UDP-based protocol. Accordingly, image frames may be lost during transmission or reception of the image frames from the wireless ultrasound probe to the display device, such as if a network socket is not ready to accept more data at a time an image frame is ready to be sent or if one of the UDP packets are dropped in transit. Additionally, image frames may be lost within the wireless ultrasound probe, such as when frame processing of a wireless ultrasound probe is temporarily limited due to high processor load.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is disclosed for providing feedback to a user of a wireless ultrasound probe regarding a wireless link quality between the ultrasound probe and a display device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Certain embodiments may be found in a method and system for providing feedback to a user of a wireless ultrasound probe regarding a wireless link quality between the ultrasound probe and a display device. For example, aspects of the present disclosure have the technical effect of providing a display device with an acquisition frame rate of a wireless ultrasound probe. Moreover, aspects of the present disclosure have the technical effect of determining an analysis interval length of received ultrasound image frames based on an acquisition frame rate and a wireless connection state threshold. Furthermore, aspects of the present disclosure have the technical effect of dynamically updating an analysis interval length based on changes to an acquisition frame rate at a wireless ultrasound probe. Additionally, aspects of the present disclosure have the technical effect of presenting a connection state at a display system of display device.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized, and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising", "including", or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode (2D mode), three-dimensional (3D) mode, 3D Zoom mode (e.g., thin slab), M-mode, CF-mode, PW Doppler, CW Doppler, Contrast Enhanced Ultrasound (CEUS), and/or sub-modes of B-mode and/or CF such as Harmonic Imaging, Shear Wave Elasticity Imaging (SWEI), Strain Elastography, TVI, PDI, B-flow, MVI, UGAP, and in some cases also MM, CM, TVD where the "image" and/or "plane" includes a single beam or multiple beams.

Furthermore, the term processor or processing unit, as used herein, refers to any type of processing unit that can carry out the required calculations needed for the various embodiments, such as single or multi-core: CPU, Accelerated Processing Unit (APU), Graphic Processing Unit (GPU), DSP, FPGA, ASIC or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". Also, forming of images may be performed using channel combinations that may originate from more than one transmit event (e.g., synthetic aperture techniques).

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 1.

Figure 1:
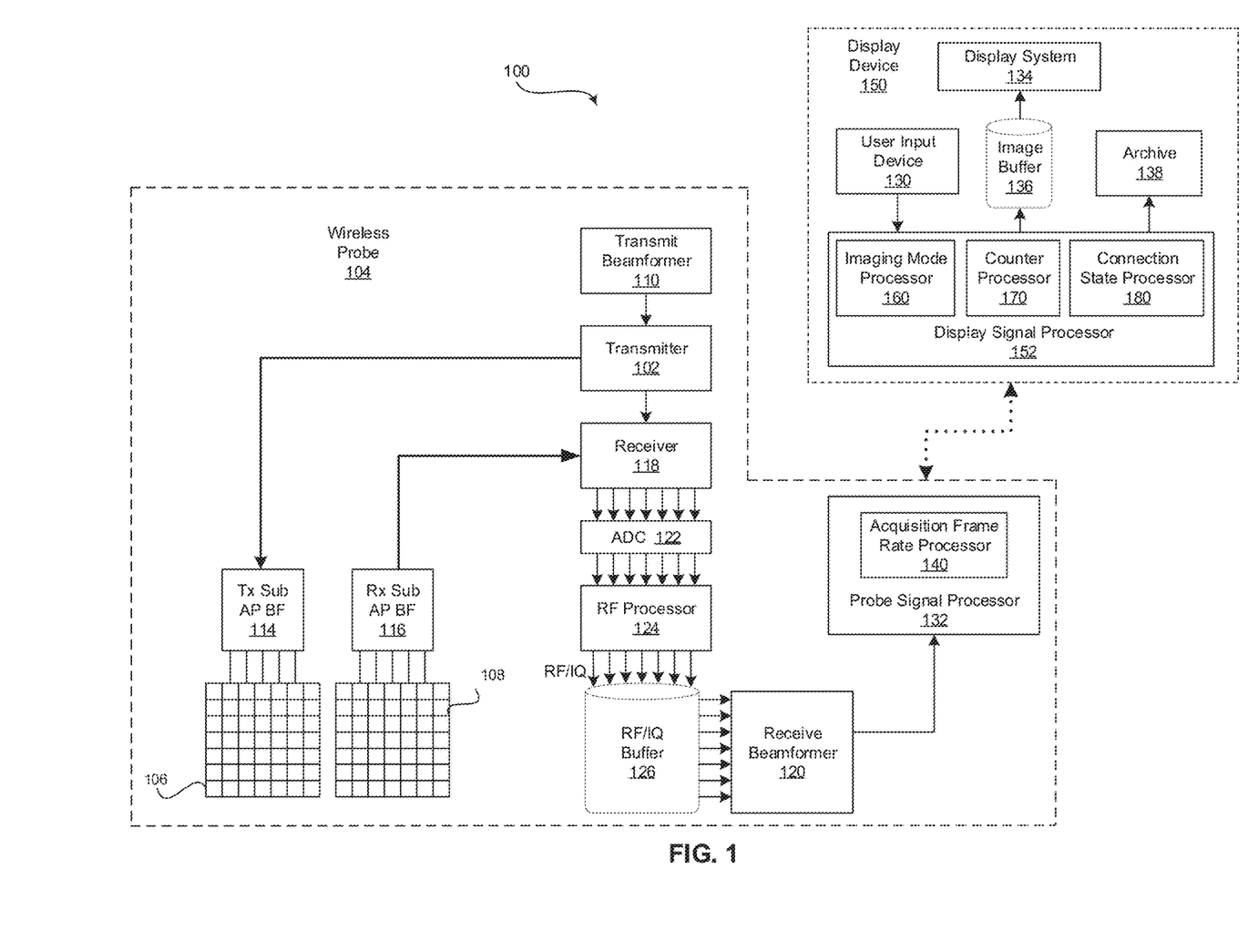
FIG. 1 is a block diagram of an exemplary ultrasound system that is operable to provide feedback to a user of a wireless ultrasound probe regarding a wireless link quality between the ultrasound probe and a display device, in accordance with various embodiments.

FIG. 1 is a block diagram of an exemplary ultrasound system 100 that is operable to provide feedback to a user of a wireless ultrasound probe 104 regarding a wireless link quality between the ultrasound probe 104 and a display device 150, in accordance with various embodiments. Referring to FIG. 1, there is shown an ultrasound system 100 comprising a wireless ultrasound probe 104 and a display device 150. The wireless ultrasound probe 104 comprises a transmitter 102, a transmit beamformer 110, a receiver 118, a receive beamformer 120, transducer elements 106, transmit 114 and receive 116 sub-aperture beamformers, A/D converters 122, a RF processor 124, a RF/IQ buffer 126, a probe signal processor 132, and a probe transceiver.

The transmitter 102 of the wireless ultrasound probe 104 may comprise suitable logic, circuitry, interfaces and/or code that may be operable to drive the wireless ultrasound probe 104. The wireless ultrasound probe 104 may comprise a two-dimensional (2D) array of piezoelectric elements. In various embodiments, the wireless ultrasound probe 104 may comprise a matrix array transducer or any suitable transducer operable to acquire 2D and/or 3D (including 4D) ultrasound image datasets. The wireless ultrasound probe 104 may comprise a group of transmit transducer elements 106 and a group of receive transducer elements 108, that normally constitute the same elements. In certain embodiment, the wireless ultrasound probe 104 may be operable to acquire ultrasound image data covering at least a substantial portion of an anatomy, such as a heart, a fetus, a lung, a blood vessel, or any suitable anatomical structure.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the wireless ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive the signals from the receive sub-aperture beamformer 116. The analog signals may be communicated to one or a plurality of A/D converters 122.

The plurality of A/D converters 122 may comprise suitable logic, circuitry, interfaces and/or code that may be operable to convert the analog signals from the receiver 118 to corresponding digital signals. The plurality of A/D converters 122 are disposed between the receiver 118 and the RF processor 124. Notwithstanding, the disclosure is not limited in this regard. Accordingly, in some embodiments, the plurality of A/D converters 122 may be integrated within the receiver 118.

The RF processor 124 may comprise suitable logic, circuitry, interfaces and/or code that may be operable to demodulate the digital signals output by the plurality of A/D converters 122. In accordance with an embodiment, the RF processor 124 may comprise a complex demodulator (not shown) that is operable to demodulate the digital signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

The receive beamformer 120 may comprise suitable logic, circuitry, interfaces and/or code that may be operable to perform digital beamforming processing to, for example, sum the delayed channel signals received from RF processor 124 via the RF/IQ buffer 126 and output a beam summed signal. The resulting processed information may be the beam summed signal that is output from the receive beamformer 120 and communicated to the probe signal processor 132. In accordance with some embodiments, the receiver 118, the plurality of A/D converters 122, the RF processor 124, and the beamformer 120 may be integrated into a single beamformer, which may be digital. In various embodiments, the ultrasound system 100 comprises a plurality of receive beamformers 120.

The probe signal processor 132 may comprise suitable logic, circuitry, interfaces and/or code that may be operable to process ultrasound scan data (i.e., summed IQ signal) for generating ultrasound image frames for transmission via a transceiver (not shown) to the display device 150. The probe signal processor 132 is operable to perform one or more processing operations according to a plurality of selectable ultrasound modalities on the acquired ultrasound scan data. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation.

The probe signal processor 132 may be one or more central processing units, graphic processing units, microprocessors, microcontrollers, and/or the like. The probe signal processor 132 may comprise an acquisition frame rate processor 140 and may be capable of receiving input information from the display device 150, communicating an acquisition frame rate to the display device 150, and transmitting ultrasound image frames to the display device 150, among other things. The probe signal processor 132 and acquisition frame rate processor 140 may be capable of executing any of the method(s) and/or set(s) of instructions discussed herein in accordance with the various embodiments, for example.

The ultrasound system 100 may be operable to continuously acquire ultrasound scan data at an acquisition frame rate that is suitable for the imaging situation in question. Typical acquisition frame rates range from 5-30 frames per second but may be lower or higher. The acquired ultrasound scan data processed as ultrasound image frames by the probe signal processor 132 may be wirelessly transmitted to the display device 150 for further display processing and display on the display system 134 at a display-rate that can be the same as the frame rate, or slower or faster. The wireless connection between the wireless probe 104 and the display device 150 may be Wi-Fi or any suitable wireless connection. In various embodiments, a probe transceiver may be configured to transmit ultrasound image frames from the probe signal processor 132 to a display device transceiver of the display device 150 via the wireless connection according to the user datagram protocol (UDP) communications protocol. In certain embodiments, the probe transceiver may be configured to transmit the acquisition frame rate and other suitable messages from the acquisition frame rate processor 140 and/or the probe signal processor 132 via the wireless connection to the display device transceiver of the display device 150 according to the transmission control protocol (TCP) communications protocol. In a representative embodiment, the probe transceiver may be configured to receive messages from the display device transceiver of the display device 150 via the wireless connection according to the transmission control protocol (TCP) communications protocol. For example, the probe transceiver may receive messages related to an imaging mode, imaging parameters, imaging presets, settings, and/or the like from a display device signal processor 152 of the display device 150 via the display device transceiver. The messages may be provided by the probe transceiver to the probe signal processor 132 for controlling configuration and/or operation of the wireless ultrasound probe 104.

The probe signal processor 132 may include an acquisition frame rate processor 140 that comprises suitable logic, circuitry, interfaces and/or code that may be operable to determine an acquisition frame rate of the wireless ultrasound probe 104. For example, the probe signal processor 132 may receive an imaging mode, imaging parameters, imaging presets, settings, and/or the like from the display device 150 via the wireless connection (e.g., using TCP) to configure the wireless ultrasound probe 104 for ultrasound image acquisition. The acquisition frame rate processor 140 may be configured to determine the acquisition frame rate based on the configuration and operating condition of the wireless ultrasound probe 104. The acquisition frame rate processor 140 may be configured to transmit the determined acquisition frame rate to the display device 150 via the probe transceiver communicating with the display device transceiver over the wireless connection. The acquisition frame rate processor 140 may dynamically update the acquisition frame rate and communicate the updated frame rate to the display device based on changes to the configuration and/or operating condition (e.g., temperature) of the wireless ultrasound probe 104. In various embodiments, the acquisition frame rate may be transmitted by the acquisition frame rate processor 140 via the probe transceiver over the wireless connection to the display device transceiver of the display device 150 according to the transmission control protocol (TCP) communications protocol.

The display device 150 may be a handheld device (e.g., smart phone, tablet computer, or the like), a laptop computer, a desktop computer, and/or any suitable device having a display system. The display device 150 comprises a user input device 130, a display signal processor 152, an image buffer 136, a display system 134, an archive 138, and a display device transceiver. The user input device 130 may be utilized to input patient data, imaging modes, image acquisition and scan parameters, settings, configuration parameters, select protocols and/or templates, select wireless connection state thresholds, and the like. In an exemplary embodiment, the user input device 130 may be operable to configure, manage and/or control operation of one or more components and/or modules in the ultrasound system 100. In this regard, the user input device 130 may be operable to configure, manage and/or control operation of the transmitter 102, the ultrasound probe 104, the transmit beamformer 110, the receiver 118, the receive beamformer 120, the RF processor 124, the RF/IQ buffer 126, the user input device 130, the probe signal processor 132, the image buffer 136, the display system 134, the archive 138, and/or the probe and display device transceivers. For example, an imaging mode, imaging parameters, imaging presets, settings, and/or the like received via the user input device may be communicated to the wireless ultrasound probe 104 for configuration of the probe 104. The user input device 130 may include button(s), rotary encoder(s), a touchscreen, motion tracking, voice recognition, a mousing device, keyboard, camera and/or any other device capable of receiving a user directive. In certain embodiments, one or more of the user input devices 130 may be integrated into other components, such as the display system 134, for example. As an example, the user input device 130 may include a touchscreen display.

The display signal processor 152 may comprise suitable logic, circuitry, interfaces and/or code that may be operable to process the ultrasound image frames received from the wireless ultrasound probe 104 for presentation at the display system 134. The display signal processor 152 is operable to perform one or more processing operations according to a plurality of selectable ultrasound modalities on the received ultrasound image frames. In an exemplary embodiment, the display signal processor 150 may be operable to perform display processing and/or control processing, among other things. In various embodiments, the processed ultrasound image frames can be presented at the display system 134 and/or may be stored at the archive 138. The archive 138 may be a local archive, a Picture Archiving and Communication System (PACS), or any suitable device for storing images and related information.

The display signal processor 152 may be one or more central processing units, graphic processing units, microprocessors, microcontrollers, and/or the like. The display signal processor 152 may be an integrated component, or may be distributed across various locations, for example. In an exemplary embodiment, the display signal processor 152 may comprise an imaging mode processor 160, a counter processor 170, and a connection state processor 180 and may be capable of receiving input information from a user input device 130 and/or archive 138, generating an output displayable by a display system 134, and manipulating the output in response to input information from a user input device 130, among other things. The display signal processor 152, imaging mode processor 160, counter processor 170, and connection state processor 180 may be capable of executing any of the method(s) and/or set(s) of instructions discussed herein in accordance with the various embodiments, for example.

The display signal processor 152 may include an imaging mode processor 160 that comprises suitable logic, circuitry, interfaces and/or code that may be operable to receive and/or retrieve an imaging mode, imaging parameters, imaging presets, settings, and/or the like (i.e., wireless ultrasound probe 104 imaging settings) from the user input device 130 and/or the archive 138 for configuration of the wireless ultrasound probe 104. For example, the imaging mode processor 160 may receive user instructions via the user input device 130 to set or change the wireless ultrasound probe 104 imaging settings. Additionally and/or alternatively, the imaging mode processor 160 may retrieve default and/or stored wireless ultrasound probe 104 imaging settings from the archive 138 and/or any suitable data storage medium. The imaging mode processor 160 may be configured to transmit the wireless ultrasound probe 104 imaging settings via a display device transceiver over a wireless connection to the probe signal processor 132 of the wireless ultrasound probe 104. The display device transceiver may be configured to transmit the wireless ultrasound probe 104 imaging settings to the wireless ultrasound probe 104 via the wireless connection according to the transmission control protocol (TCP) communications protocol. The wireless ultrasound probe 104 imaging settings may be provided by the probe transceiver to the probe signal processor 132 for controlling configuration and/or operation of the wireless ultrasound probe 104.

The display signal processor 152 may include a counter processor 170 that comprises suitable logic, circuitry, interfaces and/or code that may be operable to count a number of ultrasound image frames received from the wireless ultrasound probe 104 over an analysis interval length determined by the connection state processor 180 as described below. The counter processor 170 may be configured to provide the number of received ultrasound image frames over each analysis interval length to the connection state processor 180. The counter processor 170 may be configured to reset the count to zero (0) after each analysis interval length. The counter processor 170 may be configured to reset the count to zero (0) in response to an instruction from the connection state processor 180. For example, as described below, the connection state processor 180 may instruct the counter processor 170 to reset in response to receiving an updated acquisition frame rate from the wireless ultrasound probe 104.

The display signal processor 152 may include a connection state processor 180 that comprises suitable logic, circuitry, interfaces and/or code that may be operable to determine a connection state of the wireless connection between the wireless ultrasound probe 104 and the display device 150 and cause the display system 134 to present an indication of the connection state. The connection state processor 180 may be configured to receive the acquisition frame rate from the wireless ultrasound probe 104. The connection state processor 180 may be configured to determine the at least one wireless connection state threshold. For example, the connection state processor 180 may determine a first threshold for changing from a good connection state to a bad connection state and a second threshold for changing from the bad connection state to the good connection state. In various embodiments, the first threshold and the second threshold may be different. For example, the first threshold may be a loss of 10% of the ultrasound image frames expected to be received based on the acquisition frame rate to change from a good connection state to a bad connection state and the second threshold may be a loss of 5% of the ultrasound image frames expected to be received based on the acquisition frame rate to change from a bad connection state to a good connection state. The second threshold may be less loss in order to ensure a good connection has been reestablished. The at least one threshold may be a default, selected by a user, and/or determined based on the received acquisition frame rate. As an example, the connection state processor 180 may define the at least one wireless connection state loss threshold to be greater allowed loss for higher frame rates, and less allowed loss for lower frame rates. As another example, the connection state processor 180 may define the at least one wireless connection state loss threshold based on a user input received via the user input device selecting the at least one loss threshold. In various embodiments, default loss thresholds may be pre-defined and stored at archive 138 and/or any suitable data storage medium for retrieval by the connection state processor 180. The connection state processor 180 may be configured to dynamically determine and/or update the at least one wireless connection state loss threshold in response to receiving the acquisition frame rate and/or an updated acquisition frame rate from the wireless ultrasound probe 104.

The connection state processor 180 may be configured to determine an analysis interval length based on the received acquisition frame rate and the wireless connection state loss threshold. The interval length is the amount of time the received ultrasound image frames are counted to determine the connection state. In various embodiments, the interval length may be between one (1) second and six (6) seconds but may be lower or higher. The connection state processor 180 may determine longer interval lengths (e.g., 4-6 seconds) for smaller loss thresholds (e.g., 5% loss) and/or smaller acquisition frame rates (e.g., 5-15 frames per second). The connection state processor 180 may determine smaller interval lengths (e.g., 1-3 seconds) for greater loss threshold (e.g., 10% loss) and/or higher acquisition frame rates (e.g., 20-30 frames per second). The connection state processor 180 may determine the interval length in a weighted or non-weighted manner based on the received acquisition frame rate and the wireless connection state loss threshold. The connection state processor 180 may be configured to retrieve the number of received ultrasound image frames counted by the counter processor 170 periodically at the end of the determined interval length. The connection state processor 180 may dynamically determine and/or update the interval length in response to receiving the acquisition frame rate and/or an updated acquisition frame rate from the wireless ultrasound probe 104. The connection state processor 180 may instruct the counter processor 170 to reset in response to receiving the acquisition frame rate and/or updated acquisition frame rate from the wireless ultrasound probe 104.

The connection state processor 180 may be configured to determine whether the ultrasound image frames lost exceeds the wireless connection state loss threshold based on the acquisition frame rate and the interval length. For example, if the current wireless connection state is a good state, the acquisition frame rate is 25 frames per second, the analysis interval length is 1.0 seconds, the loss threshold is 10% of the ultrasound image frames expected to be received, and the number of counted received ultrasound image frames over the analysis interval length is 20 frames, the number of ultrasound image frames lost (i.e., 25 expected−20 received=5 frames) would exceed the loss threshold of 2.5 frames (i.e., 10% of 25 frames/second*1.0 seconds). Accordingly, the connection state processor 180 would change the connection state from a good state to a bad state.

The connection state processor 180 may be configured to change or maintain the connection state based on the current connection state and the determination of whether the ultrasound image frames lost exceed the wireless connection state loss threshold. For example, the connection state processor 180 may update the connection state from a good state to a bad state when the ultrasound image frames lost exceed the wireless connection state loss threshold. The connection state processor 180 may update the connection state from a bad state to a good state when the ultrasound image frames lost do not exceed the wireless connection state loss threshold. The connection state processor 180 may maintain the connection state in a good state when the ultrasound image frames lost do not exceed the wireless connection state loss threshold. The connection state processor may maintain the connection state in a bad state when the ultrasound image frames lost exceeds the wireless connection state loss threshold. The connection state processor 180 may be configured to cause the display system 134 of the display device 150 to present the connection state. For example, the connection state may be represented by an icon, color-coding, text, and/or the like. The connection state may be continuously presented at the display system 134 and/or alerts regarding a change in the connection state may be presented at the display system 134.

Figure 2:
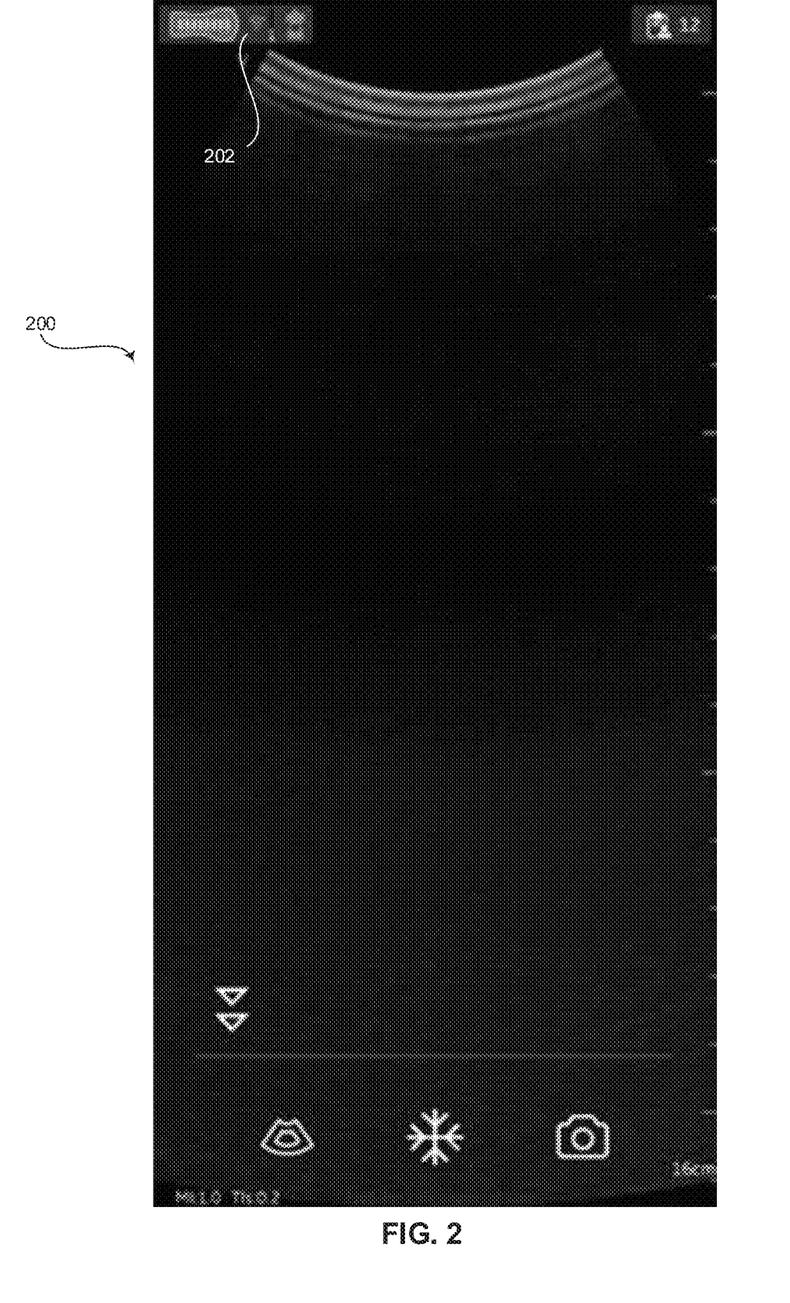
FIG. 2 illustrates a screenshot of an exemplary ultrasound image display having an indication of a good connection status, in accordance with various embodiments.

FIG. 2 illustrates a screenshot of an exemplary ultrasound image display 200 having an indication 202 of a good connection status, in accordance with various embodiments. Referring to FIG. 2, the ultrasound image display 200 includes an exemplary wireless icon 202 that may be color-coded green to represent a good connection status. The indication 202 of the good connection status is shown presented at a top of the ultrasound image display 200 but could be presented at any suitable position on the ultrasound image display 200. The indication 202 of the good connection status may be continuously presented and/or dynamically updated to provide a user feedback regarding the connection status, such that the user is aware whether the acquired ultrasound image frames are substantially present or if an unacceptable number of ultrasound image frames may be missing.

Figure 3:
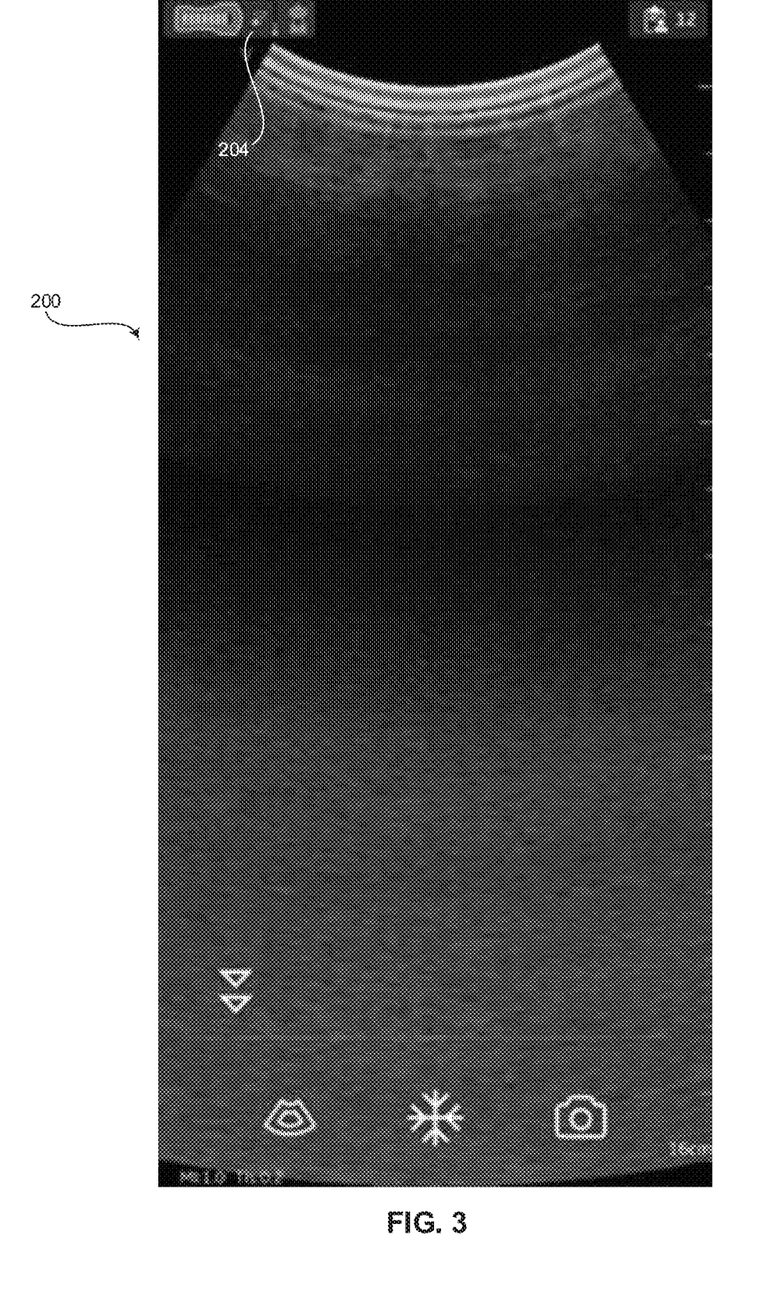
FIG. 3 illustrates a screenshot of an exemplary ultrasound image display having an indication of a bad connection status, in accordance with various embodiments.

FIG. 3 illustrates a screenshot of an exemplary ultrasound image display 200 having an indication 204 of a bad connection status, in accordance with various embodiments. Referring to FIG. 3, the ultrasound image display 200 includes an exemplary wireless icon 204, which may be color-coded grey, with an exclamation point, which may be color-coded yellow or red, to represent a bad connection status. The indication 204 of the bad connection status is shown presented at a top of the ultrasound image display 200 but could be presented at any suitable position on the ultrasound image display 200. The indication 204 of the bad connection status may be continuously presented and/or dynamically updated to provide a user feedback regarding the connection status, such that the user is aware whether the acquired ultrasound image frames are substantially present or if an unacceptable number of ultrasound image frames may be missing.

Referring again to FIG. 1, the image buffer 136 of the display device 150 is included for storing processed frames of received ultrasound image frames that are not scheduled to be displayed immediately. Preferably, the image buffer 136 is of sufficient capacity to store at least several minutes' worth of ultrasound image frames. The ultrasound image frames are stored in a manner to facilitate retrieval thereof according to its order or time of acquisition. The image buffer 136 may be embodied as any known data storage medium.

The display system 134 may be any device capable of communicating visual information to a user. For example, a display system 134 may include a liquid crystal display, a light emitting diode display, and/or any suitable display or displays. The display system 134 can be operable to present ultrasound image frames, a connection status 202, 204, and/or any suitable information.

The archive 138 may be one or more computer-readable memories integrated with the display device 150 and/or communicatively coupled (e.g., over a network) to the display device 150, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the display device signal processor 152, for example. The archive 138 may be able to store data temporarily or permanently, for example. The archive 138 may be capable of storing medical image data, data generated by the display device signal processor 152, the probe signal processor 132, and/or instructions readable by the signal processor(s) 132, 152, among other things. In various embodiments, the archive 138 stores ultrasound images, wireless ultrasound probe settings, received acquisition frame rates, wireless connection state loss thresholds, analysis interval lengths, instructions for determining loss thresholds, instructions for determining analysis interval lengths, instructions for determining whether lost frames exceed the loss threshold, and/or instructions for presenting a connection status, for example.

Components of the ultrasound system 100 may be implemented in software, hardware, firmware, and/or the like. The various components of the ultrasound system 100 may be communicatively linked. Components of the ultrasound system 100 may be implemented separately and/or integrated in various forms. For example, the display system 134 and the user input device 130 may be integrated as a touchscreen display.

Figure 4:
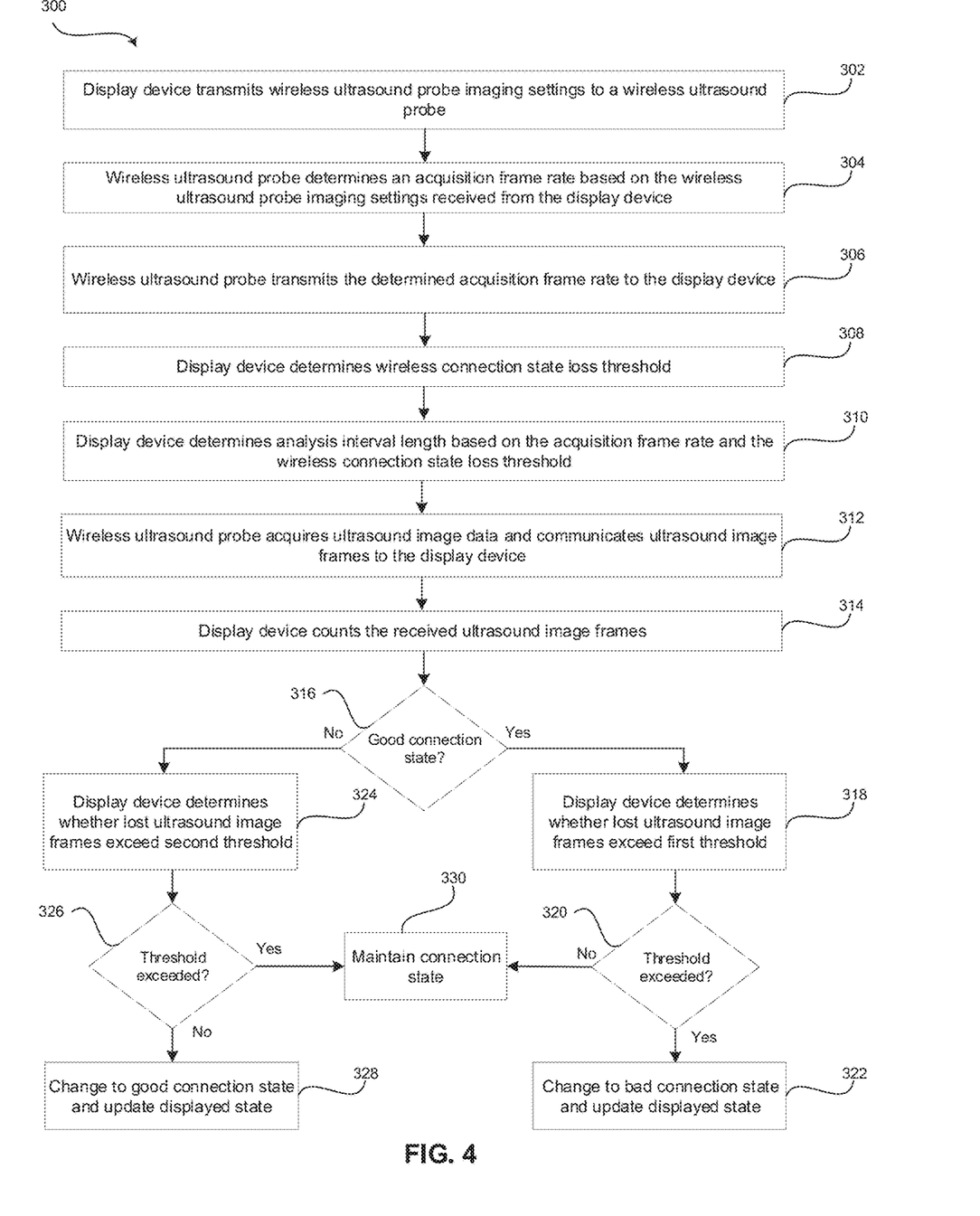
FIG. 4 is a flow chart illustrating exemplary steps that may be utilized for providing feedback to a user of a wireless ultrasound probe regarding a wireless link quality between the ultrasound probe and a display device, in accordance with various embodiments.

FIG. 4 is a flow chart 300 illustrating exemplary steps 302-330 that may be utilized for providing feedback 202, 204 to a user of a wireless ultrasound probe 104 regarding a wireless link quality between the ultrasound probe 104 and a display device 150, in accordance with various embodiments. Referring to FIG. 4, there is shown a flow chart 300 comprising exemplary steps 302 through 330. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 302, a display device 150 transmits wireless ultrasound probe imaging settings to a wireless ultrasound probe 104. For example, an imaging mode processor 160 of the display device signal processor 152 of the display device may be operable to receive and/or retrieve an imaging mode, imaging parameters, imaging presets, settings, and/or the like (i.e., wireless ultrasound probe imaging settings) from a user input device 130 and/or the archive 138 for configuration of the wireless ultrasound probe 104. The wireless ultrasound probe imaging settings may be user selected settings and/or default settings. The imaging mode processor 160 may be configured to transmit the wireless ultrasound probe imaging settings via a display device transceiver over a wireless connection to the probe signal processor 132 of the wireless ultrasound probe 104 according to the transmission control protocol (TCP) communications protocol. The wireless ultrasound probe imaging settings may be provided by the probe transceiver to the probe signal processor 132 for controlling configuration and/or operation of the wireless ultrasound probe 104

At step 304, the wireless ultrasound probe 104 determines an acquisition frame rate based on the wireless ultrasound probe imaging settings received from the display device 150. For example, an acquisition frame rate processor 140 of a probe signal processor 132 of the wireless ultrasound probe 104 may be operable to determine an acquisition frame rate of the wireless ultrasound probe 104. The probe signal processor 132 may receive an imaging mode, imaging parameters, imaging presets, settings, and/or the like from the display device 150 via the wireless connection (e.g., using TCP) to configure the wireless ultrasound probe 104 for ultrasound image acquisition at step 302. The acquisition frame rate processor 140 may be configured to determine the acquisition frame rate based on the configuration and operating condition of the wireless ultrasound probe 104. The acquisition frame rate processor 140 may dynamically update the acquisition frame rate based on changes to the configuration and/or operating condition (e.g., temperature) of the wireless ultrasound probe 104.

At step 306, the wireless ultrasound probe 104 transmits the determined acquisition frame rate to the display device 150. For example, the acquisition frame rate processor 140 may be configured to transmit the determined acquisition frame rate to the display device 150 via the probe transceiver communicating with the display device transceiver over the wireless connection according to the transmission control protocol (TCP) communications protocol.

At step 308, the display device 150 determines a wireless connection state loss threshold. For example, a connection state processor 180 of the display device signal processor 152 of the display device 150 may be configured to determine the at least one wireless connection state loss threshold. The connection state processor 180 may determine a first threshold for changing from a good connection state to a bad connection state and a second threshold for changing from the bad connection state to the good connection state. In various embodiments, the first threshold and the second threshold may be different. The at least one wireless connection state loss threshold may be a default, selected by a user, and/or determined based on the received acquisition frame rate (e.g., greater loss threshold for higher acquisition frame rates). The connection state processor 180 may be configured to dynamically determine and/or update the at least one wireless connection state loss threshold in response to receiving the acquisition frame rate and/or an updated acquisition frame rate from the wireless ultrasound probe 104.

At step 310, the display device 150 determines an analysis interval length based on the acquisition frame rate and the wireless connection state loss threshold. For example, the analysis interval length is the amount of time the received ultrasound image frames are counted to determine the connection state. In various embodiments, the interval length may be between one (1) second and six (6) seconds but may be lower or higher. The connection state processor 180 may determine longer interval lengths (e.g., 4-6 seconds) for smaller loss thresholds (e.g., 5% loss) and/or smaller acquisition frame rates (e.g., 5-15 frames per second). The connection state processor 180 may determine smaller interval lengths (e.g., 1-3 seconds) for greater loss threshold (e.g., 10% loss) and/or higher acquisition frame rates (e.g., 20-30 frames per second). The connection state processor 180 may determine the interval length in a weighted or non-weighted manner based on the received acquisition frame rate and the wireless connection state loss threshold. The connection state processor 180 may dynamically determine and/or update the interval length in response to receiving the acquisition frame rate and/or an updated acquisition frame rate from the wireless ultrasound probe 104.

At step 312, the wireless ultrasound probe 104 acquires ultrasound image data and communicates ultrasound image frames to the display device 150. For example, a wireless ultrasound probe 104 in the ultrasound system 100 may be operable to continuously acquire ultrasound scan data at an acquisition frame rate that is suitable for the imaging situation in question. Typical acquisition frame rates range from 5-30 frames per second but may be lower or higher. The acquired ultrasound scan data processed as ultrasound image frames by the probe signal processor 132 may be wirelessly transmitted to the display device 150 for further display processing and display on the display system 134 at a display-rate that can be the same as the frame rate, or slower or faster. The wireless connection between the wireless probe 104 and the display device 150 may be Wi-Fi or any suitable wireless connection. In various embodiments, a probe transceiver may be configured to transmit ultrasound image frames from the probe signal processor 132 to a display device transceiver of the display device 150 via the wireless connection according to the user datagram protocol (UDP) communications protocol.

At step 314, the display device 150 counts the received ultrasound image frames. For example, a counter processor 170 of the display device signal processor 152 may be operable to count a number of ultrasound image frames received from the wireless ultrasound probe 104 over an analysis interval length determined by the connection state processor 180 at step 310. The counter processor 170 may be configured to provide the number of received ultrasound image frames over each analysis interval length to the connection state processor 180. The counter processor 170 may be configured to reset the count to zero (0) after each analysis interval length. The counter processor 170 may be configured to reset the count to zero (0) in response to an instruction from the connection state processor 180, such as in response to receiving an updated acquisition frame rate from the wireless ultrasound probe 104.

At step 316, if the connection state between the wireless ultrasound probe 104 and the display device is a good connection state, the method 300 proceeds to step 318. If the connection state between the wireless ultrasound probe 104 and the display device is a bad connection state, the method 300 proceeds to step 324. Initially, the connection state may begin in either of the good or bad connection states by default, user selection, or any suitable connection state analysis process.

At step 318, the display device 150 determines whether the lost ultrasound image frames exceed a first wireless connection state loss threshold. For example, the connection state processor 180 may determine a number of frames lost by subtracting the counted received ultrasound image frames as determined by the counter processor 170 from the expected number of received ultrasound image frames determined based on the acquisition frame rate and the analysis interval length (e.g., 25 frames/second over a 2.0 second analysis interval length would equal 50 expected ultrasound image frames). The connection state processor 180 compares the number of frames lost to a threshold loss number determined by multiplying the determined loss threshold to the acquisition rate, and multiplying the result by the analysis interval length (e.g., 10% loss threshold*25 frames/second*2.0 seconds=5 frames). If the number of lost frames exceeds the threshold loss number, the connection state processor 180 determines that the lost ultrasound image frames exceed a first wireless connection state loss threshold. If the number of lost frames is less than the threshold loss number, the connection state processor 180 determines that the lost ultrasound image frames do not exceed a first wireless connection state loss threshold. In various embodiments, the first wireless connection state loss threshold may be a threshold specific to the good connection state and may be different from a second wireless connection state loss threshold specific to the bad connection state.

At step 320, if the number of lost frames exceeds the first wireless connection state loss threshold, the method proceeds to step 322. If the number of lost frames does not exceed the first wireless connection state loss threshold, the method proceeds to step 330.

At step 322, the display device 150 changes the connection state from a good connection state to a bad connection state and updates the displayed state. For example, the connection state processor 180 may update the connection state from a good state to a bad state when the ultrasound image frames lost exceeds the wireless connection state loss threshold as determined at step 318. The connection state may be represented by an icon, color-coding, text, and/or the like. The connection state may change from the good connection state to the bad connection state and be continuously presented at the display system 134 such that the user is aware that an unacceptable number of ultrasound image frames may be missing.

At step 324, the display device 150 determines whether the lost ultrasound image frames exceeds a second wireless connection state loss threshold. For example, the connection state processor 180 may determine a number of frames lost by subtracting the counted received ultrasound image frames as determined by the counter processor 170 from the expected number of received ultrasound image frames determined based on the acquisition frame rate and the analysis interval length. The connection state processor 180 compares the number of frames lost to a threshold loss number determined by multiplying the determined loss threshold to the acquisition rate, and multiplying the result by the analysis interval length. If the number of lost frames exceeds the threshold loss number, the connection state processor 180 determines that the lost ultrasound image frames exceed a second wireless connection state loss threshold. If the number of lost frames is less than the threshold loss number, the connection state processor 180 determines that the lost ultrasound image frames do not exceed a second wireless connection state loss threshold. In various embodiments, the second wireless connection state loss threshold may be a threshold specific to the bad connection state and may be different from a first wireless connection state loss threshold specific to the good connection state used in step 318. For example, the first threshold may be a loss of 10% (or any suitable percentage) of the ultrasound image frames expected to be received based on the acquisition frame rate to change from a good connection state to a bad connection state and the second threshold may be a loss of 5% (or any suitable percentage) of the ultrasound image frames expected to be received based on the acquisition frame rate to change from a bad connection state to a good connection state. The second threshold may be a lower loss threshold in order to ensure a good connection has been reestablished.

At step 326, if the number of lost frames exceeds the second wireless connection state loss threshold, the method proceeds to step 330. If the number of lost frames does not exceed the first wireless connection state loss threshold, the method proceeds to step 328.

At step 328, the display device 150 changes the connection state from a bad connection state to a good connection state and updates the displayed state. For example, the connection state processor 180 may update the connection state from a bad state to a good state when the ultrasound image frames lost do not exceed the wireless connection state loss threshold as determined at step 324. The connection state may be represented by an icon, color-coding, text, and/or the like. The connection state may change from the bad connection state to the good connection state and be continuously presented at the display system 134 such that the user is aware that the acquired ultrasound image frames are substantially present.

At step 330, the display device 150 maintains and continues to present the connection state. For example, the connection state processor 180 may maintain the connection state in a good state when the ultrasound image frames lost do not exceed the wireless connection state loss threshold. The connection state processor may maintain the connection state in a bad state when the ultrasound image frames lost exceed the wireless connection state loss threshold. The connection state processor 180 may be configured to cause the display system 134 of the display device 150 to present the connection state. For example, the connection state may be represented by an icon, color-coding, text, and/or the like. The connection state may be continuously presented at the display system 134 such that the user is aware whether the acquired ultrasound image frames are substantially present or if an unacceptable number of ultrasound image frames may be missing.

Steps 316 through 330 may be repeated periodically. For example, the connection state processor 180 may be configured to retrieve the number of received ultrasound image frames counted by the counter processor 170 at step 314 periodically at the end of the interval length determined at step 310.

Aspects of the present disclosure provide a method 300 and system 100 for providing feedback 202, 204 to a user of a wireless ultrasound probe 104 regarding a wireless link quality between the ultrasound probe 104 and a display device 150. The method 300 may comprise receiving 306, by at least one display processor 152, 160 of a display device 150, an acquisition frame rate from a wireless ultrasound probe 104. The method 300 may comprise determining 310, by the at least one display processor 152, 180, a first analysis interval length based on the acquisition frame rate and a first wireless connection state loss threshold. The method 300 may comprise receiving 312 and counting 314, by the at least one display processor 152, 170, ultrasound image frames wirelessly transmitted to the display device 150 from the wireless ultrasound probe 104 during the first analysis interval length. The method 300 may comprise determining 318, by the at least one display processor 152, 180, that a first number of lost ultrasound frames during the first analysis interval length exceeds the first wireless connection state loss threshold. The method 300 may comprise causing 322, by the at least one display processor 152, 180, a display system 134 of the display device 150 to present a bad connection state identifier 204.

In a representative embodiment, the method 300 may comprise determining 310, by the at least one display processor 152, 180, a second analysis interval length based on the acquisition frame rate and a second wireless connection state loss threshold. The method 300 may comprise receiving 312 and counting 314, by the at least one display processor 152, 170, the ultrasound image frames wirelessly transmitted to the display device 150 from the wireless ultrasound probe 104 during the second analysis interval length. The method 300 may comprise determining 324, by the at least one display processor 152, 180, that a second number of lost ultrasound frames during the second analysis interval length exceeds the second wireless connection state loss threshold. The method 300 may comprise causing 330, by the at least one display processor 152, 180, the display system 134 to continue presenting the bad connection state identifier 204. In an exemplary embodiment, the method 300 may comprise determining 310, by the at least one display processor 152, 180, a second analysis interval length based on the acquisition frame rate and a second wireless connection state loss threshold. The method 300 may comprise receiving 312 and counting 314, by the at least one display processor 152, 170, the ultrasound image frames wirelessly transmitted to the display device 150 from the wireless ultrasound probe 104 during the second analysis interval length. The method 300 may comprise determining 324, by the at least one display processor 152, 180, that a second number of lost ultrasound frames during the second analysis interval length does not exceed the second wireless connection state loss threshold. The method 300 may comprise causing 328, by the at least one display processor 152, 180, the display system 134 to change from presenting the bad connection state identifier 204 to presenting a good connection state identifier 202. In various embodiments, the first wireless connection state loss threshold corresponds with a good connection state and the second wireless connection state loss threshold corresponds with a bad connection state. In certain embodiments, the first wireless connection state loss threshold is larger than the second wireless connection state loss threshold. In a representative embodiment, the first wireless connection state loss threshold is based on the acquisition frame rate. In an exemplary embodiment, the method 300 may comprise communicating 302, by the display device 150, wireless ultrasound probe imaging settings to the wireless ultrasound probe 104. The acquisition frame rate may be determined by the wireless ultrasound probe 104 based on the wireless ultrasound probe imaging settings.

Various embodiments provide an ultrasound system 100 for providing feedback 202, 204 to a user of a wireless ultrasound probe 104 regarding a wireless link quality between the ultrasound probe 104 and a display device 150. The ultrasound system 100 may comprise a wireless ultrasound probe 104 and a display device 150, and at least one processor 132, 140, 152, 160, 170, 180. The wireless ultrasound probe 104 may be operable to wirelessly transmit an acquisition frame rate to a display device 150. The wireless ultrasound probe 104 may be operable to wirelessly transmit ultrasound image frames to the display device 150. The display device 150 may comprise at least one display processor 152, 160, 170, 180 and a display system 134. The at least one display processor 152, 180 may be configured to determine an analysis interval length based on the acquisition frame rate and a wireless connection state loss threshold. The at least one display processor 152, 170 may be configured to count the ultrasound image frames received from the wireless ultrasound probe 104 during the analysis interval length. The at least one display processor 150, 180 may be configured to determine whether a number of lost ultrasound frames during the analysis interval length exceeds the wireless connection state loss threshold. The display system 134 may be configured to present a bad connection state identifier when the number of lost ultrasound frames during the analysis interval length exceeds the wireless connection state loss threshold. The display system 134 may be configured to present a good connection state identifier when the number of lost ultrasound frames during the analysis interval length does not exceed the wireless connection state loss threshold.

In an exemplary embodiment, the ultrasound image frames are wirelessly transmitted to the display device 150 according to a user datagram protocol (UDP) communications protocol. In various embodiments, the display device 150 is configured to wirelessly transmit wireless ultrasound probe imaging settings to the wireless ultrasound probe 104. The wireless ultrasound probe 104 may comprise at least one probe processor 132, 140 configured to determine the acquisition frame rate based on the wireless ultrasound probe imaging settings. In certain embodiments, the wireless ultrasound probe imaging settings are wirelessly transmitted from the display device 150 to the wireless ultrasound probe 104 according to a transmission control protocol (TCP) communications protocol. In a representative embodiment, the acquisition frame rate is wirelessly transmitted from the wireless ultrasound probe 104 to the display device 150 according to a transmission control protocol (TCP) communications protocol. In an exemplary embodiment, the wireless connection state loss threshold is based on a current state of a wireless connection between the wireless ultrasound probe 104 and the display device 150. In various embodiments, the wireless connection state loss threshold is based on the acquisition frame rate. In certain embodiments, a wireless connection between the wireless ultrasound probe 104 and the display device 150 is a Wi-Fi connection.

Certain embodiments provide a non-transitory computer readable medium having stored thereon, a computer program having at least one code section. The at least one code section is executable by a machine for causing the machine to perform steps 300. The steps 300 may comprise receiving 306 an acquisition frame rate from a wireless ultrasound probe 104 at a display device 150. The steps 300 may comprise determining 310 a first analysis interval length based on the acquisition frame rate and a first wireless connection state loss threshold. The steps 300 may comprise receiving 312 and counting 314 ultrasound image frames wirelessly transmitted to the display device 150 from the wireless ultrasound probe 104 during the first analysis interval length. The steps 300 may comprise determining 318 that a first number of lost ultrasound frames during the first analysis interval length exceeds the first wireless connection state loss threshold. The steps 300 may comprise causing 322 a display system 134 of the display device 150 to present a bad connection state identifier 204.

In various embodiments, the steps 300 may comprise determining 310 a second analysis interval length based on the acquisition frame rate and a second wireless connection state loss threshold. The steps 300 may comprise receiving 312 and counting 314 the ultrasound image frames wirelessly transmitted to the display device 150 from the wireless ultrasound probe 104 during the second analysis interval length. The steps 300 may comprise determining 324 that a second number of lost ultrasound frames during the second analysis interval length exceeds the second wireless connection state loss threshold. The steps 300 may comprise causing 330 the display system 134 to continue presenting the bad connection state identifier 204. In certain embodiments, the steps 300 may comprise determining 310 a second analysis interval length based on the acquisition frame rate and a second wireless connection state loss threshold. The steps 300 may comprise receiving 312 and counting 314 the ultrasound image frames wirelessly transmitted to the display device 150 from the wireless ultrasound probe 104 during the second analysis interval length. The steps 300 may comprise determining 324 that a second number of lost ultrasound frames during the second analysis interval length does not exceed the second wireless connection state loss threshold. The steps 300 may comprise causing 328 the display system 134 to change from presenting the bad connection state identifier 204 to presenting a good connection state identifier 202. In a representative embodiment, the first wireless connection state loss threshold corresponds with a good connection state and the second wireless connection state loss threshold corresponds with a bad connection state. The first wireless connection state loss threshold may be larger than the second wireless connection state loss threshold. In an exemplary embodiment, the first wireless connection state loss threshold is based on the acquisition frame rate.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for providing feedback to a user of a wireless ultrasound probe regarding a wireless link quality between the ultrasound probe and a display device.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   receiving, by at least one display processor of a display device, an acquisition frame rate from a wireless ultrasound probe;
   determining, by the at least one display processor, a first analysis interval length based on the acquisition frame rate and a first wireless connection state loss threshold;
   receiving and counting, by the at least one display processor, ultrasound image frames wirelessly transmitted to the display device from the wireless ultrasound probe during the first analysis interval length;
   determining, by the at least one display processor, that a first number of lost ultrasound frames during the first analysis interval length exceeds the first wireless connection state loss threshold; and
   causing, by the at least one display processor, a display system of the display device to present a bad connection state identifier.

2. The method of claim 1, further comprising:
   determining, by the at least one display processor, a second analysis interval length based on the acquisition frame rate and a second wireless connection state loss threshold;
   receiving and counting, by the at least one display processor, the ultrasound image frames wirelessly transmitted to the display device from the wireless ultrasound probe during the second analysis interval length;
   determining, by the at least one display processor, that a second number of lost ultrasound frames during the second analysis interval length exceeds the second wireless connection state loss threshold; and
   causing, by the at least one display processor, the display system to continue presenting the bad connection state identifier.

3. The method of claim 1, further comprising:
   determining, by the at least one display processor, a second analysis interval length based on the acquisition frame rate and a second wireless connection state loss threshold;

receiving and counting, by the at least one display processor, the ultrasound image frames wirelessly transmitted to the display device from the wireless ultrasound probe during the second analysis interval length;

determining, by the at least one display processor, that a second number of lost ultrasound frames during the second analysis interval length does not exceed the second wireless connection state loss threshold; and causing, by the at least one display processor, the display system to change from presenting the bad connection state identifier to presenting a good connection state identifier.

4. The method of claim 3, wherein the first wireless connection state loss threshold corresponds with a good connection state and the second wireless connection state loss threshold corresponds with a bad connection state.

5. The method of claim 4, wherein the first wireless connection state loss threshold is larger than the second wireless connection state loss threshold.

6. The method of claim 1, wherein the first wireless connection state loss threshold is based on the acquisition frame rate.

7. The method of claim 1, comprising:
communicating, by the display device, wireless ultrasound probe imaging settings to the wireless ultrasound probe,
wherein the acquisition frame rate is determined by the wireless ultrasound probe based on the wireless ultrasound probe imaging settings.

8. An ultrasound system, comprising:
a wireless ultrasound probe operable to:
wirelessly transmit an acquisition frame rate to a display device; and
wirelessly transmit ultrasound image frames to the display device; and
the display device comprising:
at least one display processor configured to:
determine an analysis interval length based on the acquisition frame rate and a wireless connection state loss threshold;
count the ultrasound image frames received from the wireless ultrasound probe during the analysis interval length; and
determine whether a number of lost ultrasound frames during the analysis interval length exceeds the wireless connection state loss threshold; and
a display system configured to:
present a bad connection state identifier when the number of lost ultrasound frames during the analysis interval length exceeds the wireless connection state loss threshold; and
present a good connection state identifier when the number of lost ultrasound frames during the analysis interval length does not exceed the wireless connection state loss threshold.

9. The system of claim 8, wherein the ultrasound image frames are wirelessly transmitted to the display device according to a user datagram protocol (UDP) communications protocol.

10. The system of claim 8, wherein:
the display device is configured to wirelessly transmit wireless ultrasound probe imaging settings to the wireless ultrasound probe, and
the wireless ultrasound probe comprises at least one probe processor configured to determine the acquisition frame rate based on the wireless ultrasound probe imaging settings.

11. The system of claim 10, wherein the wireless ultrasound probe imaging settings are wirelessly transmitted from the display device to the wireless ultrasound probe according to a transmission control protocol (TCP) communications protocol.

12. The system of claim 8, wherein the acquisition frame rate is wirelessly transmitted from the wireless ultrasound probe to the display device according to a transmission control protocol (TCP) communications protocol.

13. The system of claim 8, wherein the wireless connection state loss threshold is based on a current state of a wireless connection between the wireless ultrasound probe and the display device.

14. The system of claim 8, wherein the wireless connection state loss threshold is based on the acquisition frame rate.

15. The system of claim 8, wherein a wireless connection between the wireless ultrasound probe and the display device is a Wi-Fi connection.

16. A non-transitory computer readable medium having stored thereon, a computer program having at least one code section, the at least one code section being executable by a machine for causing the machine to perform steps comprising:
receiving an acquisition frame rate from a wireless ultrasound probe at a display device;
determining a first analysis interval length based on the acquisition frame rate and a first wireless connection state loss threshold;
receiving and counting ultrasound image frames wirelessly transmitted to the display device from the wireless ultrasound probe during the first analysis interval length;
determining that a first number of lost ultrasound frames during the first analysis interval length exceeds the first wireless connection state loss threshold; and
causing a display system of the display device to present a bad connection state identifier.

17. The non-transitory computer readable medium of claim 16, further comprising:
determining a second analysis interval length based on the acquisition frame rate and a second wireless connection state loss threshold;
receiving and counting the ultrasound image frames wirelessly transmitted to the display device from the wireless ultrasound probe during the second analysis interval length;
determining that a second number of lost ultrasound frames during the second analysis interval length exceeds the second wireless connection state loss threshold; and
causing the display system to continue presenting the bad connection state identifier.

18. The non-transitory computer readable medium of claim 16, further comprising:
determining a second analysis interval length based on the acquisition frame rate and a second wireless connection state loss threshold;
receiving and counting the ultrasound image frames wirelessly transmitted to the display device from the wireless ultrasound probe during the second analysis interval length;
determining that a second number of lost ultrasound frames during the second analysis interval length does not exceed the second wireless connection state loss threshold; and causing the display system to change from presenting the bad connection state identifier to presenting a good connection state identifier.

19. The non-transitory computer readable medium of claim 18, wherein:
the first wireless connection state loss threshold corresponds with a good connection state,
the second wireless connection state loss threshold corresponds with a bad connection state, and
the first wireless connection state loss threshold is larger than the second wireless connection state loss threshold.

20. The non-transitory computer readable medium of claim 16, wherein the first wireless connection state loss threshold is based on the acquisition frame rate.

* * * * *